(12) United States Patent
Thioliere et al.

(10) Patent No.: US 7,094,743 B2
(45) Date of Patent: Aug. 22, 2006

(54) COMPOSITION, WIPE AND METHOD FOR CLEANING, PROTECTING AND IMPARTING GLOSS TO A SUBSTRATE

(75) Inventors: Stephane Thioliere, Marly le Roi (FR); Mitchell T. Johnson, Hudson, WI (US); Dominique Rolly, Deinze (BE)

(73) Assignee: 3M Innovative Properties Company, St. Paul, MN (US)

( * ) Notice: Subject to any disclaimer, the term of this patent is extended or adjusted under 35 U.S.C. 154(b) by 224 days.

(21) Appl. No.: 10/628,931

(22) Filed: Jul. 29, 2003

(65) Prior Publication Data
US 2005/0022309 A1    Feb. 3, 2005

(51) Int. Cl.
*C11D 17/00*    (2006.01)

(52) U.S. Cl. ............... 510/295; 510/438; 510/286; 428/98; 8/94.115

(58) Field of Classification Search ........... 8/94.15; 428/98; 510/438, 295, 286, 98; 106/10
See application file for complete search history.

(56) References Cited

U.S. PATENT DOCUMENTS

| | | | |
|---|---|---|---|
| 3,965,519 A * | 6/1976 | Hermann | ........ 15/104.93 |
| 4,497,919 A | 2/1985 | Varga et al. | |
| 5,674,558 A | 10/1997 | Speer | |
| 5,782,692 A | 7/1998 | Burke et al. | |
| 6,013,323 A | 1/2000 | Klayder et al. | |
| 2002/0039985 A1 | 4/2002 | Lam | |
| 2002/0183233 A1 * | 12/2002 | Mitra et al. | ........ 510/438 |
| 2003/0216273 A1 * | 11/2003 | Mitra et al. | ........ 510/295 |

FOREIGN PATENT DOCUMENTS

| | | |
|---|---|---|
| EP | 0210656 | 7/1986 |
| WO | WO 00/68189 | 11/2000 |
| WO | WO 02/14443 | 2/2002 |
| WO | WO 02/38850 | 5/2002 |
| WO | WO 02/057535 | 7/2002 |

* cited by examiner

*Primary Examiner*—Yogendra Gupta
*Assistant Examiner*—Derrick G. Hamlin

(57) ABSTRACT

The present invention involves a composition comprising a fluorochemical compound, an agent to impart gloss, and water, and a wipe containing this composition. The composition and wipe are preferably used for cleaning, protecting and imparting gloss to a substrate, such as natural or artificial leather.

31 Claims, No Drawings

COMPOSITION, WIPE AND METHOD FOR CLEANING, PROTECTING AND IMPARTING GLOSS TO A SUBSTRATE

The present invention relates to a composition comprising a fluorochemical compound, an agent to impart gloss and water. Furthermore, the invention relates to a wipe comprising the composition. Composition and wipe of the invention are preferably used for cleaning, protecting and imparting gloss to a substrate, preferably natural or artificial leather. The invention thus also relates to a method of treating a substrate, especially natural or artificial leather by contacting the substrate with the composition and/or the wipe of the invention.

BACKGROUND

Finished leather products generally require maintenance polishes to preserve, clean and water-proof them. For this reason, many products referred to as leather protectants can be found on the market. These protective products include, e.g. shoe polishes used to impart a high-gloss, maintain the feel of the leather and increase the leather's resistance to weathering, scuffing and scratching. The majority of shoe polishes are of the solvent paste type based on solvents and waxes. Silicone-based products constitute another type of protectant applied to leather, vinyl and rubber.

U.S. Pat. No. 4,497,919, for example, discloses an emulsion-type polish composition suitable for treating natural and synthetic leather articles that provides a durable high-gloss finish that is substantially self-polishing. The composition is a water-in-oil emulsion comprising a wax mixture, a film-forming agent, a film-modifying agent, a non-ionic emulsifying agent, an anionic dispersing agent, a thickening agent, a solvent, a preservative and water. U.S. Pat. No. 5,674,558 describes a wipe-on clear protectant based on a polyurethane, which provides a finish that is durable and long-lasting, is not injurious to the leather or artificial leather on which it is applied and is not slippery or tacky to the touch. In the protectant, polyurethane is dissolved in isopropyl alcohol and ethylene glycol monobutyl ether is added.

The resulting liquid is wiped as a clear liquid onto the surface of the cleaned and dry leather or artificial leather product which is to be protected. The finish is said to dry clear, even, water-proof, smooth and without tackiness in less than 30 minutes. US-A-2002/0039985 discloses a liquid cleaning composition for cleaning plastic, leather, and vinyl surfaces comprising:
a) a volume of cleaning solution; and
b) a fragrance, wherein a user would spray the cleaning composition onto the surface to be cleaned, and further wherein a user would then wipe up the cleaning composition.

The known leather treatment compositions, however, cannot be considered satisfactory in all aspects. The solvent paste type based shoe polishes, for example, dry after application to a dull finish and must be buffed to produce a high natural shine. The protective effect they produce tends to deluster quite quickly on exposure to moisture. Silicone-based leather treating compositions, on the other hand, leave a somewhat greasy or slippery feel on the leather after they are used. These compositions also tend to encourage plasticizer migration rendering the leather or vinyl harder and more brittle. In addition, the known leather treating agents are not completely satisfactory as regards combined water and oil resistance as well as gloss of the treated leather surface. They also often suffer from the disadvantage that dust sticks to the surface of the treated leather and is not easy to remove.

WO-A-00/68189 discloses fluorochemical compounds comprising:
a) a fluorochemical oligomeric portion comprising an aliphatic backbone with a plurality of pendant fluoroaliphatic groups, each fluoroaliphatic group having a fully fluorinated terminal group and each independently linked to a carbon atom of the aliphatic backbone through an organic linking group;
b) an aliphatic moiety; and
c) a linking group which links the fluorochemical oligomeric portion to the aliphatic moiety.

These fluorochemical compounds are said to be useful as topical treatments for fibrous substrates such as textiles and fabrics, and as polymer melt additives to provide desirable oil, water and stain repellency to shaped articles such as fibers. WO-A-02/38850 discloses a method of treating fibrous substrates, such as leather, by contacting the substrate with a fluorochemical compound as disclosed in WO-A-00/68189 to provide desirable oil, water and stain repellency to the leather.

SUMMARY

In one aspect, the present invention provides a composition which is able to provide a cleaning effect, and protection against water and oily stains while imparting gloss to a substrate treated therewith, such as a surface of natural or artificial leather.

Another aspect of the invention is to provide a wipe which can be used for the treatment of surfaces, such as natural or artificial leather, for cleaning, providing protection against water and oily stains and at the same time imparting gloss to the surface.

A further aspect of the invention is to provide a method of treating a substrate, such as natural or artificial leather, for cleaning, providing protection against water and oily stains and at the same time imparting gloss to the surface.

These and other aspects of the invention can be achieved on the basis of the surprising finding that a fluorochemical compound can be combined with an agent to impart gloss while maintaining oil repellency, and that, in addition, the combination of fluorochemical compound and agent to impart gloss can be delivered out of an aqueous system.

DETAILED DESCRIPTION

In one embodiment, the present invention comprises:
a) a fluorochemical compound;
b) an agent to impart gloss; and
c) water.

The fluorochemical compounds used in the composition may be, for example, alkylated fluorochemical oligomeric compounds, such as those as described in WO-A-00/68189 and WO-A-02/38850. For example, the fluorochemical compound may comprise:
a) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;
b) an aliphatic moiety; and
c) a linking group which links the fluorochemical oligomeric portion to the aliphatic moiety.

Especially preferred fluorochemical compounds include fluorochemical acrylate polymers and fluorochemical urethanes. Suitable fluorochemical compounds are commercially available from 3M Company, St. Paul, Minn., U.S.A., under the trade names PM-490, PM-930, PM-4700, PM-4701 and PM-4800.

Examples of suitable agents to impart gloss are polyacrylates, waxes, polyurethanes, silicones, paraffin and paraffin/mineral oil blends. Among them, polyacrylates and natural waxes like carnauba waxes and montan waxes are preferred.

Preferably, the fluorochemical compound and the agent to impart gloss are toxicologically acceptable compounds.

A specific example of a preferred composition comprises:
a) from about 1 to 30% by weight of the fluorochemical compound;
b) from about 1 to 30% by weight of the agent imparting gloss; and
c) the remainder up to 100% by weight water.

The composition may comprise, at the expense of the amount of water, several further ingredients for special purposes. One such further ingredient is an agent enhancing the penetration of the composition into a substrate. Suitable agents include alkyl ethers of propylene and dipropylene glycols, with preferred agents being dipropylene glycol methyl ether, propylene glycol and fluoroaliphatic polymeric esters. The agent enhancing penetration of the composition into a substrate may be comprised in the composition in an amount of about 1 to 30% by weight.

A further additional component of the composition may be a biocide. Specific examples thereof are benzalkonium chloride, citric acid and methyl paraben as anionic preservatives, or the non-ionic preservatives that are commercially available under the trade names "Tektamer® 38" from Calgon Corporation of Pittsburgh, Pa., U.S.A.; and "Lonza Glydant® Plus" from Lonzagroup of Fairlawn, N.J., U.S.A. If included in the composition, the biocide is preferably present in an amount of about 0.05 to 3% by weight.

A surfactant also may be included in the composition. Specific examples of suitable surfactants are polyoxyethylene sorbitan monooleates and sorbitan monooleates, which are commercially available under the trade names "Tween" and "Span", respectively, from Uniqema of New Castle, Del., U.S.A. In one embodiment, the surfactant may be present in the composition of the invention in an amount of about 0.05 to 5% by weight.

Another embodiment of the composition comprises:
a) from about 5 to 20% by weight of a fluorochemical acrylate polymer, such as PM-4701;
b) from about 2 to 15% by weight of carnauba and/or montan wax;
c) from about 2 to 15% by weight of dipropylene glycol methyl ether;
d) from about 0.1 to 1.0% by weight of benzalkonium chloride; and
e) from about 49.0 to 91.9% by weight of water.

Another embodiment of the present invention is a wipe which comprises a fabric or a sponge impregnated with one of the above-described compositions. The fabric is preferably a non-woven fabric and the sponge may be formed from, for example, cellulose, polyurethane or melamine.

In one embodiment, the amount of the composition in the wipe is in the range of about 100 to 200%, preferably about 100 to 150%, of the weight of the wipe.

A further embodiment of the present invention is the use of a composition as described above, or of a wipe as described above, for cleaning, protecting and imparting gloss to a substrate, wherein the substrate to be treated preferably is natural or artificial leather.

Still a further embodiment of the invention is a method of treating a substrate, especially the surface of natural or artificial leather, which comprises contacting the substrate with a composition of the invention, and/or with a wipe containing the composition of the invention.

The Fluorochemical Compound

In an embodiment of the invention, the fluorochemical compound serves the purpose of providing protection against water and oily stains to the treated substrate, especially to a surface of natural or artificial leather. Any fluorochemical compound may be suitable in this embodiment provided that it is compatible with the other ingredients of the composition.

Preferred fluorochemical compounds include the alkylated fluorochemical oligomers disclosed in WO-A-00/68189. Specific examples of commercially available fluorochemical oligomeric compounds suitable for this embodiment of the invention are the products sold by 3M Company, St. Paul, Minn., U.S.A., under the trade names PM-4700, PM-4701 and PM-4800.

Other fluorochemical compounds suitable for use in the compositions described herein include fluorochemical urethanes, examples of which are described in WO 02/14443. Specific examples of suitable fluorochemical urethane compounds are the products sold by 3M Company, St. Paul, Minn., U.S.A., under the trade names PM 490 and PM 930.

Among the fluorochemicals which are suitable for the compositions described herein, it is preferable to use toxicologically acceptable compounds. Other fluorochemicals may be used, even if they are less acceptable as with respect to the toxicological profile. For example, irritation of the human skin may be tolerated provided that corresponding measures of protection are taken; e.g., the use of gloves.

An especially preferred fluorochemical compound is the commercial product PM-4701, which is toxicologically acceptable and provides good protection against water and oily stains, and is furthermore surprisingly compatible with a wide variety of agents to impart gloss.

The amount of the fluorochemical compound within the composition is not specifically limited. A preferred lower limit of the amount of the fluorochemical compound within the composition is about 1% by weight (here, and in the following discussion, the amounts are always based on a total of 100% for the entire composition, including water). The upper limit of the amount of the fluorochemical compound is not critical, and is mainly governed by economic considerations. For this reason, the upper limit of the amount of the fluorochemical compound is preferably about 20%–30% by weight, although greater amounts are suitable for many applications.

Some commercial fluorochemical compounds, like PM-4701, may be include minor amounts of additives, such as wetting agents, surfactants or penetration agents. The amounts of these additives are included in the total amount of fluorochemical if present in the composition.

The Agent to Impart Gloss

In embodiments of the invention, a fluorochemical compound can be combined with an agent to impart gloss, and still maintain its oil-repellency improving effect. In addition, the combination of fluorochemical compound and agent to impart gloss can be delivered out of an aqueous system. Several classes of agents to impart gloss can be employed.

These classes include, but are not limited to, polyacrylates, waxes, polyurethanes, silicones, paraffin and paraffin/mineral oil blends.

One preferred class of agents to impart gloss are polyacrylates. These substances include copolymers of different methacrylates, like methylmethacrylate and stearylmethacrylate, with acrylates, such as isooctylacrylate, and acrylic acid. They may be employed as a solution in suitable solvents, like ethylacetate. A suitable polyacrylate is RODACRYL 114 available from Rohm GmbH of Darmstadt, Germany.

Another preferred class of agents to impart gloss are waxes, especially natural waxes like carnauba waxes and montan waxes or mixtures thereof. A suitable wax is CIRES ML available from Cire Chimie Contact of Romainville, France. A preferred wax mixture is the product "Cires Waxy 30%", also available from Cire Chimie Contact of Romainville, France.

Polyurethanes, such as the product sold under the trade name Spenlite® L90-20A polyurethane laquer, which is available from Reichhold Chemicals, Inc. of NC, U.S.A., and RODAPUR 309 available from Rohm GmbH of Darmstadt, Germany, may also be used. Silicones may also be used. However, the use of silicones may be limited in some embodiments by the somewhat greasy or slippery feel that they may produce on the leather surface on which they are used, and by their tendency in some compositions or formulations to decrease the resistance to oily stains that is imparted by the fluorochemical compound. Further suitable agents to impart gloss are paraffin or paraffin/mineral oil blends.

The agent to impart gloss is preferably toxicologically acceptable.

The amount of the agent to impart gloss is not critical. For economic reasons, however, it may be preferred to use agents to impart gloss generally within the range of about 1 to 30% by weight.

Optional Ingredients

The embodiments described herein generally consist of fluorochemical compounds and agents to impart gloss with the remainder water. They may also contain further ingredients, such as agents enhancing penetration of the composition into a substrate, biocides, surfactants and solvents. The further ingredients are preferably toxicologically acceptable compounds.

The Agent Enhancing Penetration

This class of substances may be used in cases where enhanced penetration is desired of the fluorochemical compound and/or agent to impart gloss into the surface of the substrate to be treated, for example, leather. Suitable members of this class of substances include alkyl ethers of propylene and dipropylene glycols, and preferred penetration-enhancing agents are dipropylene glycol methyl ether (DPM), propylene glycol and fluoroaliphatic polymeric esters.

The amount of the agent enhancing penetration to be used is not specifically limited. A preferred amount is from about 1 to 30% by weight, preferably from about 2 to 15% by weight.

The Biocide

A biocide is often used in the composition of the present invention in order to avoid growth of bacteria or fungi, especially when the composition is to be used to impregnate wipes. The biocide may be selected from among those known to be efficacious in wet wipe formulations, according to their performance and toxicological profile, and considering their compatibility with the other ingredients of the composition.

Specific examples of suitable biocides include benzalkonium chloride, citric acid, methyl paraben, anionic and non-ionic preservatives, including the commercial products sold under the trade names "Tektamer® 38" from Calgon Corporation of Pittsburgh, Pa., U.S.A.; and "Lonza Glydant® Plus" from Lonzagroup of Fairlawn, N.J., U.S.A.

The amount of the biocide to be used is not particularly critical. Generally, it may be used in an amount from about 0.05 to 3% by weight, preferably from about 0.1 to 1.0% by weight.

The Surfactant

The compositions of the present invention may further contain a surfactant. Specific examples of suitable surfactants are polyoxyethylene sorbitan monooleates and sorbitan monooleates, which are commercially available under the trade names "Tween" and "Span", respectively, from Uniqema, New Castle, Del., U.S.A.

The amount of surfactant used in the compositions of the present invention is not critical. Generally, a surfactant may be used in an amount from about 0.05 to 5% by weight, preferably from about 0.1 to 2% by weight.

Additional Solvents

The compositions of the present invention may contain, in addition to water, further solvents, such as butylcellosolve or ethylacetate. The amount of such solvents is not particularly critical but will generally be kept low for economic and toxicological/environmental reasons. Generally, the amount of solvent other than water will not substantially exceed 20% by weight.

Further Optional Ingredients

The compositions of the present invention may also contain further known ingredients which are generally used in leather treatment compositions. Within this group of substances other known oil and/or water repellent compositions and/or siloxane-softening agents and conventional leather finishing agents may be used; e.g., retanning and fatliquoring agents, as well as fragrances.

Preparation of the Composition

Generally, embodiments of the present invention may be prepared by just blending the ingredients, without any further processing being necessary to provide a composition which is ready for use. If necessary, one or more ingredients may be warmed to a temperature above room temperature. Such a premix of the final composition may be homogenized (by normal industrial methods) in order to provide a more uniform emulsion. Solvents such as ethylacetate, if present, may be removed by evaporation at e.g. 50 to 70° C.

The Wipe

One preferred method of applying the compositions described herein to a substrate is through the use of a wipe which is impregnated with the aforementioned composition and which is moved over the surface to be treated whereby the composition is applied to the substrate. The wipe may be one made of a material as generally used for applying liquid formulations to surfaces to be treated. It may consist of a fabric or a sponge which is impregnated with a composition of the present invention. The fabric is preferably a non-woven fabric, which should be absorbent enough to hold the composition, but not so absorbent that it becomes extremely difficult to transfer the composition to the substrate to be treated. Specific examples of suitable non-woven fabrics are spun-bond or spun-lace non-woven fabrics. One preferred example of a suitable non-woven fabric is the non-woven fabric "TRIO," which is a spun-lace non-woven fabric formed from a mixture of polyester, wood pulp and viscose, and which is commercially available under the trade name "TenoLace®" from Tenotex of Temo d'Isola, Italy. Another example is a spunlace nonwoven fabric comprised of polyester and rayon available from Green Bay Nonwovens, Green Bay, Wis., U.S.A. A typical composition for that fabric is 60% rayon and 40% polyester, but the amount of rayon can be varied depending on the amount of composition with which the wipe is to be loaded. The basis weight of the nonwoven fabric is usually dictated by the required durability (so that it does not tear apart during use) and by economics. In some embodiments, a suitable range for the basis weight may be from about 50 to 120 grams per square meter (g/m$^2$), and more preferably from about 60 to 80 g/m$^2$.

Preferably, the wipe is a disposable wipe, that is, it is disposed after the impregnated composition is used up by one or several uses. Such wipes can be sold in a standard form of packaging which is commonly used for other impregnated wipes.

The amount of the composition in the wipe is generally in the range of about 100 to 200%, preferably about 100 to 150%, of the weight of the wipe. These amounts are given mainly for practical reasons: The material of the wipe should be sufficiently water-absorbable so that adequate loading can be done to allow for enough coverage to protect the substrate while not wetting it too much to cause a dark spot, for example where an overloaded wipe may release too much liquid in the initial area wiped.

The Use of the Composition and Method of Treating a Substrate

The compositions described herein are preferably used for cleaning, protecting and at the same time imparting gloss to a substrate, for example, natural or artificial leather. The method of treatment comprises contacting the substrate with the composition or with a wipe which is impregnated with a composition of the invention.

Preferred embodiments of the method include directly spraying the composition onto the substrate and then wiping it over with a dry cloth. Alternatively, a fabric or a sponge as described above can be impregnated with the composition, or the composition may be sprayed onto the fabric or the sponge which is then applied to treat the substrate. For a higher shine, another cloth can be used to polish the substrate after the composition has been applied.

The present invention is illustrated by, but is not intended to be limited to, the following examples.

EXAMPLES

Unless otherwise specified, all percentages shown in the examples and test methods which follow are percentages by weight.

Glossary

| | |
|---|---|
| PM-4800: | A fluorochemical acrylate polymer composition dissolved 40% by weight in ethyl acetate, commercially available from 3M Company, St. Paul, MN, U.S.A. |
| PM-4701: | A fluorochemical acrylate polymer composition containing minor amounts of a surfactant and propylene glycol as a penetration agent, commercially available from 3M Company, St. Paul, MN, U.S.A. |
| CIRES ML: | An emulsion of carnauba and montan waxes, commercially available from Cire Chimie Contact of Romainville, France. |
| RODACRYL 114: | An aqueous acrylic emulsion, commercially available from Rohm GmbH of Darmstadt, Germany. |
| RODA PUR 309: | An aqueous aliphatic polyurethane emulsion, commercially available from Rohm GmbH of Darmstadt, Germany. |
| CIRES WAXY 30%: | An emulsion of carnauba and montan waxes, commercially available from Cire Chimie Contact of Romainville, France. |
| DPM: | Dipropylene glycol methyl ether. |
| TWEEN 80: | A polyoxyethylene sorbitan monooleate, commercially available from Uniqema, New Castle, DE, U.S.A. |
| SPAN 80: | A sorbitan monooleate, commercially available from Uniqema, New Castle, DE, U.S.A. |
| Tektamer ® 38: | A biocide, commercially available from Calgon Corporation, Pittsburgh, PA, U.S.A. |
| Polyacrylate: | Poly(stearylmethacrylate/methylmethacrylate/Iso-octylacrylate/acrylic acid) 44/39.2/12/4.8; 33.4% in EtOAc |
| Solvent: | Butyl Cellosolve |
| Fragrance: | Hogan Fragrances Inc. H.F.-G-93-11863 |
| TRIO: | A spun-lace non-woven fabric formed from a mixture of polyester, wood pulp and viscose, which is commercially available under the trade name "TenoLace ®" from Tenotex of Terno d'Isola, Italy. |
| Green Bay non-woven: | A spun-lace non-woven fabric formed from a mixture of 60% rayon and 40% polyester and having a basis weight of 60 g/m$^2$, which is commercially available from Green Bay Nonwovens, Green Bay, WI, U.S.A. |

Test Methods

Water Repellency Test

Samples were evaluated for water repellency using a Water Repellency Test. This test is designed to provide a simple, rapid method of measurement to determine the aqueous stain resistance of substrates treated with a fluorochemical. Samples are challenged to penetrations by blends of deionized water and isopropyl alcohol (IPA). Each blend is assigned a rating number as shown below:

| Water Repellency Rating Number | Blend (% by volume) |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, the sample is placed on a flat, horizontal surface. Three small drops of water or a water/IPA mixture are gently placed in two or three different areas on the sample. If, after observing for ten seconds, two of the three drops are still visible as a sphere or a hemisphere, the sample is deemed to pass the test. The reported water repellency rating corresponds to the highest numbered water or water/IPA mixture for which the sample passes the described test.

It is preferred to have a water repellency rating of at least 4, preferably a rating of at least 6.

Oil Repellency Test

Samples were evaluated for oil repellency using an Oil Repellency Test. In this test, samples are challenged to penetration by oil or oil mixtures of varying surface tensions. Oils and oil mixtures are given a rating corresponding to the following:

| Oil Repellency Rating Number | Oil Composition |
|---|---|
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the sample passes the test.

It is preferable to have an oil repellency rating of at least 1, preferably a rating of at least 3.

Measurement of Gloss

The gloss was measured by calculating, using a reflect meter, the ratio between the gloss after and before treatment at a predetermined angle to the surface with or without polishing, or simply visually.

Examples 1 to 3

In Examples 1 to 3, several gloss-imparting agents were evaluated in compositions comprising PM-4701 as a fluorochemical compound and DPM as an agent enhancing penetration. The compositions were applied to square pieces of leather, 10 cm×10 cm, that had been dyed but not treated in any way that might waterproof the surface (i.e. the samples had a water repellency rating of 0). To apply a composition, it was loaded onto a TRIO wipe in an amount of 150% of the weight of the wipe, and the wipe was then moved over the surface of the piece of leather for 1 min to apply the composition to the surface of the leather. The composition was then left to dry for about one hour and, in some cases, was polished using a dry cloth for about 1 min.

The results are shown in Table 1.

Example 1

| | % |
|---|---|
| PM-4701 | 10.00 |
| DPM | 10.00 |
| Cires ML | 15.00 |
| Water | 65.00 |
| Total | 100.00 |

Example 2

| | % |
|---|---|
| PM-4701 | 10.00 |
| DPM | 10.00 |
| Rodacryl 114 | 10.00 |
| Water | 70.00 |
| Total | 100.00 |

Example 3

| | % |
|---|---|
| PM-4701 | 10.00 |
| DPM | 10.00 |
| Rodopur 309 | 10.00 |
| Water | 70.00 |
| Total | 100.00 |

TABLE 1

| | Weight of dry wipe [g] | Weight before application [g] | Weight after application [g] | Amount applied [g] | Water repellency | Oil repellency | Gloss (visual) |
|---|---|---|---|---|---|---|---|
| Example 1 | 2.29 | 7.31 | 6.4 | 0.91 | 2 | 2 | High gloss after polishing |
| Example 1 | 2.31 | 7.25 | 6.53 | 0.72 | 2 | 2 | |
| Example 1 | 2.08 | 6.8 | 5.58 | 1.22 | 3 | 3 | |
| Example 2 | 2.14 | 7.08 | 5.89 | 1.19 | 3 | 3 | Fair Gloss without polishing |
| Example 2 | 2.11 | 7.28 | 6.15 | 1.13 | 3 | 2 | |
| Example 2 | 2.05 | 6.85 | 5.33 | 1.52 | 4 | 2 | |
| Example 3 | 2.19 | 7.18 | 6.2 | 0.98 | 2 | 2 | Good Gloss |
| Example 3 | 2.28 | 6.93 | 5.65 | 1.28 | 3 | 2 | |

TABLE 1-continued

| | Weight of dry wipe [g] | Weight before application [g] | Weight after application [g] | Amount applied [g] | Water repellency | Oil repellency | Gloss (visual) |
|---|---|---|---|---|---|---|---|
| Example 3 | 2.22 | 6.85 | 6.39 | 0.46 | 3 | 3 | without polishing |

Examples 4 to 9

In Examples 4 to 9, compositions containing only differing amounts of PM-4701, DPM, RODACRYL and WATER (in %, based on 100% of the total composition) were evaluated for water repellency and gloss of treated samples. Oil repellency was not measured because it was assumed that it would be adequate in all cases, due to the presence of PM-4701 in the compositions. The compositions were applied to samples of leather as described for Examples 1 to 3 but, in this case, gloss was also measured after the treated samples had been dried for 12 hours and had then been polished. Gloss measurements were made at an angle of 60° to the surface of the samples.

The results are shown in Table 2.

TABLE 2

| | | | | | drying = 1 h | | drying = 12 h + polishing | |
|---|---|---|---|---|---|---|---|---|
| Example | PM-4701 | DPM | Rodacryl | Water | Water repellency | Gloss | Water repellency | Gloss |
| 4 | 20.0 | 15.0 | 7.5 | 57.5 | 5 | 2.00 | 5 | 2.18 |
| 5 | 15.0 | 11.25 | 11.25 | 62.5 | 5 | 2.36 | 5 | 2.36 |
| 6 | 15.0 | 3.75 | 11.25 | 70.0 | 5 | 2.09 | 5 | 2.18 |
| 7 | 20.0 | 15.0 | 15.0 | 50.0 | 5 | 2.30 | 5 | 2.30 |
| 8 | 10.0 | 15.0 | 15.0 | 60.0 | 5 | 2.08 | 5 | 2.15 |
| 9 | 20.0 | 7.5 | 15.0 | 57.5 | 5 | 2.50 | 5 | 2.70 |

The results in Table 2 show that the compositions of the invention provide a water repellency rating of at least 3, and a gloss of at least 2.15.

Example 10

A composition comprising a natural wax mixture as an agent to impart gloss and a biocide is formulated as follows.

| | % |
|---|---|
| PM-4701 | 10 |
| DPM | 7.5 |
| Waxy 30% | 7.5 |
| Benzalkonium chloride | 0.2 |
| Water | 74.8 |

This composition is excellent for cleaning shoes, leaves a film of protection against water, alcohol, water-based liquids and oily stains and provides a good gloss to the shoes, which can be increased by polishing with a dry cloth. The effect of the treatment persists for several days. It was found that the composition caused no discolouration, even when used on white leather.

Examples 11 and 12

The compositions shown in Table 3 were prepared by blending the mentioned ingredients (amounts in %). No processing was required to provide ready to use compositions.

TABLE 3

| | Example 11 | Example 12 |
|---|---|---|
| PM-4701 | 15 | 15 |
| SPAN 80 | 5 | — |
| Tween 80 | 2 | — |
| Polyacrylate | 10 | 10 |

TABLE 3-continued

| | Example 11 | Example 12 |
|---|---|---|
| Water | 57.95 | 64.95 |
| Solvent | 10 | 10 |
| Fragrance | 0.05 | 0.05 |

The compositions were applied to samples of leather as described for Examples 1 to 3 but using, instead of the TRIO wipes, wipes formed from the Green Bay non-woven. Gloss measurements were made at an angle of 80° to the surface of the samples.

Results

All compositions of Examples 11 and 12 provided a water repellency rating of at least 3 and an oil repellency rating of at least 2. No darkening of the samples was observed when the compositions of Examples 11 and 12 were applied at a reasonable level of application. Tektamer® 38 could be added to the compositions of Examples 11 and 12 to prevent the growth of bacteria or fungi, if required.

Examples 13 to 16

In these examples, PM-4800 was used as the fluorochemical compound. Compositions were prepared as follows, using the ingredients mentioned in Table 4 (amount in %): PM-4800 was warmed to 50° C. and then to this was added the water and the surfactants (Tween 80 and Span 80). This premix was then homogenized for 3 minutes in order to provide a uniform emulsion. This emulsion was then used as follows:

Example 13

A 70/30 blend of paraffin wax/mineral oil in the molten form was added to the emulsion, and the mixture was homogenized for 5 more minutes. At this point the ethyl acetate of the PM-4800 was removed by rotary evaporation at 50 to 70° C., following which the fragrance and solvent were added.

Example 14

The ethyl acetate of the PM-4800 was removed from the emulsion by rotary evaporation at 50 to 70° C., following which the Waxy 30% was added together with the fragrance and solvent.

Example 15

The polyacrylate was added to the emulsion, and the mixture was homogenized for 5 more minutes. At this point the ethyl acetate of the PM-4800 was removed by rotary evaporation at 50 to 70° C., following which the fragrance and solvent were added.

Example 16

The polyacrylate was added to the emulsion, and the mixture was homogenized for 5 more minutes. At this point the ethyl acetate of the PM-4800 was removed by rotary evaporation at 50 to 70° C., following which the Waxy 30% was added together with the fragrance and solvent.

|  | 13 | 14 | 15 | 16 |
|---|---|---|---|---|
| PM-4800 | 15 | 15 | 15 | 15 |
| Tween 80 | 2 | 2 | 2 | 2 |
| Span 80 | 5 | 5 | 5 | 5 |
| Paraffin/Mineral Oil | 8 | | | |
| Waxy 30% | | 15 | | 8 |
| Polyacrylate | | | 15 | 7 |
| Water | 54.5 | 47.5 | 47.5 | 47.5 |
| Solvent | 15 | 15 | 15 | 15 |
| Fragrance | 0.5 | 0.5 | 0.5 | 0.5 |

The compositions were applied to samples of leather as described for Examples 11 and 12.

Results

The compositions of Examples 13 to 16 provided oil repellency ratings in the range of from 3 to 5 and water repellency ratings in the range of from 2 to 4. In addition, it was found that the ability of the treated samples to repel water applied in the form of a spray was also markedly improved. To all of the compositions of Examples 13 to 16, Tektamer® 38 could be added to prevent the growth of bacteria or fungi, if required.

The invention claimed is:

1. A composition comprising:
    a) a fluorochemical compound selected from the group consisting of a fluorochemical acrylate polymer, a fluorochemical urethane and an alkylated fluorochemical oligomeric, said fluorochemical oligomeric compound comprising:
        i) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;
        ii) an aliphatic moiety; and
        iii) a linking group which links the fluorochemical oligomeric portion to the aliphatic moiety;
    b) an agent to impart gloss; and
    c) water.

2. The composition according to claim 1, wherein the fluorochemical compound is an alkylated fluorochemical oligomeric compound comprising:
    a) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;
    b) an aliphatic moiety; and
    c) a linking group which links the fluorochemical oligomeric portion to the aliphatic moiety.

3. The composition according to claim 1, wherein the fluorochemical compound is a fluorochemical acrylate polymer or a fluorochemical urethane.

4. The composition according to claim 1, wherein the agent to impart gloss is selected from the group consisting of polyacrylates, polyurethanes, silicones, waxes, paraffin and paraffin/mineral oil blends.

5. The composition according to claim 4, wherein the agent to impart gloss is a natural wax.

6. The composition according to claim 5, wherein the natural wax is selected from the group consisting of carnauba waxes and montan waxes.

7. The composition according to claim 1, wherein the components are toxicologically acceptable.

8. The composition according to claim 1, wherein the composition comprises:
    a) from about 1 to about 30% by weight of the fluorochemical compound;
    b) from about 1 to about 30% by weight of the agent to impart gloss; and
    c) the remainder up to 100% by weight water.

9. The composition according to claim 1, additionally comprising an agent enhancing penetration of the composition into a substrate.

10. The composition according to claim 9, wherein the agent enhancing penetration of the composition into a substrate is selected from the group consisting of alkyl ethers of propylene and dipropylene glycols.

11. The composition according to claim 9, wherein the agent enhancing penetration of the composition into a substrate is selected from the group consisting of dipropylene glycol methyl ether, propylene glycol and fluoroaliphatic polymeric esters.

12. The composition according to claim 9, wherein the agent enhancing penetration of the composition into a substrate is present in an amount of about 1 to about 30% by weight.

13. The composition according to claim 1 additionally comprising a biocide.

14. The composition according to claim 13, wherein the biocide is selected from the group consisting of benzalkonium chloride, citric acid, methyl paraben, anionic and non-ionic preservatives.

15. The composition according to claim 13, wherein the biocide is present in an amount of about 0.05 to about 3% by weight.

16. The composition according to claim 1, additionally comprising a surfactant.

17. The composition according to claim 16, wherein the surfactant is selected from the group consisting of sorbitan monooleates and polyethyleneoxide sorbitan monooleates.

18. The composition according to claim 16, wherein the surfactant is present in an amount of about 0.05 to about 5% by weight.

19. A composition according to claim 1 comprising:
a) from about 5 to about 20% by weight of a fluorochemical acrylate polymer;
b) from about 2 to about 15% by weight of carnauba and!or montan wax;
c) from about 2 to about 15% by weight of dipropylene glycol methyl ether;
d) from about 0.1 to about 1.0% by weight of benzalkonium chloride; and
e) from about 49.0 to about 91.9% by weight of water.

20. A wipe containing a composition according to claim 1.

21. A wipe according to claim 20, wherein the wipe comprises fabric or sponge.

22. A wipe according to claim 21, wherein the fabric is a non-woven fabric.

23. A wipe according to claim 20, wherein the amount of the composition in the wipe is in the range of about 100 to about 200% of the weight of the wipe.

24. A method of using the composition of claim 1 for cleaning, protecting and imparting gloss to a substrate.

25. A method of using the wipe of claim 20 for cleaning, protecting and imparting gloss to a substrate.

26. The method according to claim 24, wherein the substrate is natural or artificial leather.

27. The method according to claim 25, wherein the substrate is natural or artificial leather.

28. A method of treating a substrate by contacting the substrate with a composition according to claim 1.

29. A method of treating a substrate by contacting the substrate with a wipe of claim 20.

30. The method of claim 28, wherein the substrate is natural or artificial leather.

31. The method of claim 29, wherein the substrate is natural or artificial leather.

* * * * *

UNITED STATES PATENT AND TRADEMARK OFFICE
CERTIFICATE OF CORRECTION

PATENT NO.        : 7,094,743 B2
APPLICATION NO. : 10/628931
DATED             : August 22, 2006
INVENTOR(S)       : Stephane Thioliere It is certified that error appears in the above-identified patent and that said Letters Patent is hereby corrected as shown below:

<u>Column 3</u>
Line 10, delete "camauba" and insert -- carnauba --, therefor.
Line 50, delete "camauba" and insert -- carnauba --, therefor.

<u>Column 5</u>
Line 13, delete "camauba" and insert -- carnauba --, therefor.

<u>Column 7</u>
Line 6, delete "Temo" and insert -- Terno --, therefor.

<u>Column 14</u>
Line 42, in claim 6, delete "camauba" and insert -- carnauba --, therefor.

<u>Column 15</u>
Line 22, in claim 19, delete "andlor" and insert -- and/or --, therefor.

Signed and Sealed this

Fifteenth Day of May, 2007

JON W. DUDAS
*Director of the United States Patent and Trademark Office*